(12) United States Patent
Duyvesteyn

(10) Patent No.: US 10,260,127 B2
(45) Date of Patent: Apr. 16, 2019

(54) METHOD FOR RECOVERING SCANDIUM VALUES FROM LEACH SOLUTIONS

(71) Applicant: Scandium International Mining Corp., Sparks, NV (US)

(72) Inventor: Willem P. C. Duyvesteyn, Sparks, NV (US)

(73) Assignee: Scandium International Mining Corporation, Sparks, NV (US)

(*) Notice: Subject to any disclaimer, the term of this patent is extended or adjusted under 35 U.S.C. 154(b) by 0 days.

(21) Appl. No.: 15/963,996

(22) Filed: Apr. 26, 2018

(65) Prior Publication Data

US 2018/0312940 A1    Nov. 1, 2018

Related U.S. Application Data

(63) Continuation of application No. 14/976,421, filed on Dec. 21, 2015, now Pat. No. 9,982,326.
(Continued)

(51) Int. Cl.
 *C22B 3/26* (2006.01)
 *C22B 59/00* (2006.01)
 *C22B 3/20* (2006.01)

(52) U.S. Cl.
 CPC ............ *C22B 59/00* (2013.01); *C22B 3/0005* (2013.01); *C22B 3/20* (2013.01); *Y02P 10/234* (2015.11)

(58) Field of Classification Search
 None
 See application file for complete search history.

(56) References Cited

U.S. PATENT DOCUMENTS 371,103 A    10/1887   Smith
575,605 A    1/1897    Howe
(Continued)

OTHER PUBLICATIONS

Weiwei Wang and Chu Yong Cheng, "Separation and Purification of Scandium by Solvent Extraction and Related Technologies: A Review", J Chem Technol Biotechnol 2011; 86: 1237-1246.
(Continued)

*Primary Examiner* — Melissa S Swain
(74) *Attorney, Agent, or Firm* — John A. Fortkort; Fortkort & Houston PC

(57) ABSTRACT

A method for isolating scandium values is provided. The method includes providing a scandium-bearing ore; subjecting the scandium-bearing ore to an acid leaching process, thereby obtaining a leachate, wherein the pH of the leachate is less than 1.5; extracting scandium values from the leachate with an organic solvent, thereby obtaining a scandium-loaded organic solvent, wherein the leachate contains iron and scandium ions, and wherein the organic solvent contains a primary amine; stripping the scandium values from the scandium-loaded solvent with a stripping solution containing an acid and a salt, thereby obtaining a scandium-loaded stripping solution, wherein the acid is selected from the group consisting of sulfuric acid, nitric acid, hydrochloric acid and phosphoric acid, wherein the salt is selected from the group consisting of alkali chlorides, alkali earth chlorides, alkali nitrates, alkali sulfates, alkali phosphates, ammonium chlorides, ammonium nitrates, ammonium sulfates and ammonium phosphates, and wherein the salt comprises a cation selected from the group consisting of Na, K, Li, $NH_4$ and Mg; and processing the scandium-loaded stripping solution to yield scandium oxide.

27 Claims, 10 Drawing Sheets

Related U.S. Application Data

(60) Provisional application No. 62/095,207, filed on Dec. 22, 2014, provisional application No. 62/096,538, filed on Dec. 24, 2014.

(56) References Cited

U.S. PATENT DOCUMENTS

| | | | |
|---|---|---|---|
| 801,691 | A | 10/1905 | Ramage |
| 836,680 | A | 11/1906 | Geis |
| 3,711,032 | A | 1/1973 | Weston |
| 5,756,056 | A | 5/1998 | Kimura |
| 8,016,913 | B2 | 9/2011 | Drinkard, Jr. |
| 8,366,801 | B2 | 2/2013 | Chamberlain et al. |
| 2012/0002046 | A1 | 1/2012 | Rapoport |
| 2012/0204680 | A1 | 8/2012 | Duyvesteyn |
| 2013/0288330 | A1 | 10/2013 | Konishi |
| 2014/0314639 | A1 | 10/2014 | Mihaylov |

OTHER PUBLICATIONS

R.M. Lamya and L. Lorenzen, "Atmospheric Acid Leaching of Nickel-Copper Matte from Impala Platinum Refinerie", The Journal of the South African Institute of Mining and Metallurgy, vol. 106 (Jun. 2006).
Michael Sheedy, "RECOFLO® Ion Exchange Technology", Proceedings of the TMS Annual Meeting (San Antonio, TX1998).
S. Stopic, B. Frledrich, and R. Fuchs, "Kinetics of Sulphuric Acid Leaching of the Serbian Nickel Lateritic Ore Under Atmospheric Pressure", Metalurgija—Journal of Metallurgy, 235-244.
Michael D. Odekirk and Donna D. Harbuck, "Scandium Solvent Extraction From Liquors Produced by Leaching Sulfated Tantalwtailings", The Minerels, Metals & Materials Society, pp. 83-97 (1992).
Glenn Dobby, "Column Flotation", SGS Minerals Services Technical Paper 23 (2002).
M. C. Fuerstenau, J. D. Miller, and G. Gutierrez, "Selective Flotation of Iron Oxide", Society of Mining Engineers pp. 200-203 (Jun. 1967).
C.K. Thubakgale, R.K.K. Mbaya, K. Kabongo, "A Study of Atmospheric Acid Leaching of a South African Nickel Laterite", Minerals Engineering (2013).
J. R. Ross and J. B. Rosenbaum, "Reconnais Sance of Scandium Sources and Recovery of Scandium From Uranium Mill Solutions", Bureau of Mines Report of Investigations 6064 (1962).
Keith Quast, Akira Otsuki, Daniel Fornasiero, David J. Robinson, Jonas Addai-Mensah, "Preconcentration Strategies in the Processing of Nickel Laterite Ores Part 3: Flotation Testing", Minerals Engineering 79, pp. 279-286 (2015).
Shou Chuan Liang, You-Lan Zhong & Zhi Wang, "Enrichment of Traces of Scandium from Aqueous Solutions by Means of Flotation", Fresenius' Zeitschrift für Analytische Chemie, vol. 318, Issue 1, pp. 19-21 (Jan. 1984).
Alan Taylor, "Laterites—Still a Frontier of Nickel Process Development", TMS 142nd Annual Meeting & Exhibit, San Antonio, TX (Mar. 3-7, 2013).
John A. Kaiser, "Spec Value Hunter Comment: Recommendation Strategy for EMC Metals Corp" (2014), downloaded from http://www.kaiserresearch.com on Apr. 23, 2014.
Plinio Eduardo Praes, Rodrigo Oscar de Albuquerque, Antonio Furquim Oliveira Luz, "Recovery of Iron Ore Tailings by Column Flotation", Journal of Minerals and Materials Characterization and Engineering, vol. 1, pp. 212-216 (2013).
Mark Ma, "Froth Flotation of Iron Ores", International Journal of Mining Engineering and Mineral Processing 1(2),:5661.(2012).
"Froth Flotation", Wikipedia, The Free Encyclopedia, downloaded from https://en.wikipedia.org/wiki/Froath_Flotation on Nov. 1, 2015.
S. Komar Kawatra, "Fundamental Principles of Froth Flotation", Chap. 14.5, "SME Mining Engineering Handbook", Third Edition, pp. 1517-1531 (Ed. Peter Darling, 2011).
EMC Metals Corp., "EMC Metals files a NI43-101 Technical Report for the Nyngan Gilgai Scandium Deposit and Completes the Second Milestone in their Joint Venture Agreement with Jervois Mining Ltd.", PR Newswire (Apr. 22, 2010).
Sanja Van Huet, "Technical Report on the Nyngan Gilgai Scandium Project", NI43-101 , Jervois Mining Limited, Nyngan, New South Wales, Australia (pub. Apr. 22, 2010).
Larpro Pty Ltd., "NI 43-101 F1 Technical Report on the Feasibility of the Nyngan Scandium Project" (Oct. 24, 2014).
News Release, EMC Metals Corp., "EMC Receives Final Report on Pilot Plant TestWork for Nyngan Scandium JV Project in NSW, Australia" (Jan. 19, 2012).
J.B. Yianatos, "Column Flotation Modelling and Technology", International Colloquium: Developments in Froth Flotation: vol. 2 (Cape Town, South Africa, Aug. 3-4, 1989).
R.G. McDonald, B.I. Whittington, "Atmospheric Acid Leaching of Nickel Laterites Review Part I. Sulphuric Acid Technologies", Hydrometallurgy, vol. 91, pp. 35-55 (2008).
C.A. Biley, M. Pelser, P. den Hoed, and M. Hove, "Development of the Iron-Focused Laterite (ARFe) Process", The Southern African Institute of Mining and Metallurgy, Base Metals Conference, pp. 169-178 (2013).
Michael Sheedy, Paul Pajunen, "Acid Separation for Impurity Control and Acid Recycle Using Short Bed Ion Exchange", T.T. Chen Honorary Symposium on Hydrometallurgy, Electrometallurgy and Materials Characterization, TMS, pp. 383-395 (The Minerals, Metals & Materials Society, 2012).
M. Dejak and Kevin Munns, "Acid Purification and Recovery using Resin Sorption Technology", American Electroplaters and Surface Finishers Society, Inc.75th Annual Technical Conference—Los Angeles, Environmental II, Session F (Jun. 27-30, 1988).
The Dow Chemical Company, ANGUS™ Technical Bulletin, "PRIMENE™ JM-T Amine", Form No. 319-01003, Rev. 0 (Jul. 8, 2011).
R.K.K. Mbaya, M.M. Ramakokovhu, and C.K. Thubakgale, "Atmospheric Pressure Leaching Application for the Recovery of Copper and Nickel from Low-Grade Sources", The Southern African Institute of Mining and Metallurgy Base Metals Conference (2013).
Guo Xue-yi, Shi Wen-tang, Li Dong, Tian Qing-hua, "Leaching Behavior of Metals from Limonitic Laterite Ore by High Pressure Acid Leaching", Trans. Nonferrous Met. Soc. China 21(2011) 191-195.
Tevfik Agacayak1 and Veysel Zedef, "Dissolution Kinetics of a Lateritic Nickel Ore in Sulphuric Acid Medium", Acta Montanistica Slovaca Ročnik 17 (2012), číslo 1, 33-41.

METHOD FOR RECOVERING SCANDIUM VALUES FROM LEACH SOLUTIONS

CROSS-REFERENCE TO RELATED APPLICATIONS

This application is a continuation of U.S. Ser. No. 14/976,421, entitled "Solvent Extraction of Scandium From Leach Solutions", having the same inventor, which was filed on Dec. 21, 2015, which is incorporated herein by reference in its entirety, and which claims the benefit of priority from U.S. application No. 62/095,207, filed Dec. 22, 2014, having the same title, and the same inventor, and which is incorporated herein by reference in its entirety, and which also claims the benefit of priority from U.S. application No. 62/096,538, filed Dec. 24, 2014, having the same title, and the same inventor, and which is incorporated herein by reference in its entirety.

FIELD OF THE DISCLOSURE

The present disclosure relates generally to systems and methodologies for the recovery of scandium values, and more particularly to systems and methodologies for the solvent extraction of scandium from leach solutions.

BACKGROUND OF THE DISCLOSURE

Scandium was discovered in 1879, and was first isolated as the pure metal in 1937 by the high temperature electrolysis of a eutectic mixture of potassium, lithium and scandium chlorides. For much of its history, scandium remained a commercially insignificant metal with few known practical uses. More recently, however, a number of uses of scandium have been identified, and commercial interest in the metal has increased. For example, scandia-stabilized zirconia has gained importance as a high efficiency electrolyte in solid oxide fuel cells, while scandium oxide (scandia or $Sc_2O_3$) has found use in high intensity discharge lamps. Scandium alloys, and especially scandium aluminum alloys, have attracted interest in various aerospace applications, as demonstrated by their use in the MiG-21 and MiG-29 aircraft.

Scandium alloys offer numerous advantages over other metal alloys in various applications. For example, some scandium-reinforced alloys are much stronger than their non-scandium counterparts. Moreover, the use of scandium in some metal alloys significantly improves the grain refinement of the alloys, eliminates hot cracking and improves strength in welds. Scandium alloys also exhibit good resistance to corrosion.

Scandium-aluminum alloys are of particular commercial interest, since these alloys exhibit a lower specific gravity compared to the more widely used titanium aluminum alloys. Thus, for example, Sc—Al has a specific gravity of 2.8 compared to 4.5 for $Ti_6Al_4V$. In a commercial airline fleet, this difference in specific gravity translates into substantial fuel savings on an annual basis.

Despite the many advantages they have to offer, the widespread use of scandium and its alloys has been hampered by the low availability (and consequently high cost) of the element. Although scandium is not a particularly rare metal in terms of its abundance in the Earth's crust, there are currently no known, easily extractable deposits of minerals which contain high concentrations of the metal. Consequently, most scandium today is obtained as a byproduct of other metal recovery processes, typically from the treatment of tailings or metal sludges obtained from the refining of other metals. For example, scandium is frequently recovered as a byproduct of the treatment of tungsten and uranium tailings, or from waste streams resulting from the processing of titanium-containing ores and concentrates into titanium dioxide pigments. Scandium may also be obtained from the treatment of red mud, which is a waste product of the Bayer process used to refine bauxite into alumina.

SUMMARY OF THE DISCLOSURE

In one aspect, a method is provided for isolating scandium values. The method comprises providing a scandium-bearing ore; subjecting the scandium-bearing ore to an acid leaching process, thereby obtaining a leachate, wherein the pH of the leachate is less than 1.5; extracting scandium values from the leachate with an organic solvent, thereby obtaining a scandium-loaded organic solvent, wherein the leachate contains iron and scandium ions, and wherein the organic solvent contains a primary amine; stripping the scandium values from the scandium-loaded solvent with a stripping solution containing an acid and a salt, thereby obtaining a scandium-loaded stripping solution, wherein the acid is selected from the group consisting of sulfuric acid, nitric acid, hydrochloric acid and phosphoric acid, wherein the salt is selected from the group consisting of alkali chlorides, alkali earth chlorides, alkali nitrates, alkali sulfates, alkali phosphates, ammonium chlorides, ammonium nitrates, ammonium sulfates and ammonium phosphates, and wherein the salt comprises a cation selected from the group consisting of Na, K, Li, $NH_4$ and Mg; and processing the scandium-loaded stripping solution to yield scandium oxide.

DETAILED DESCRIPTION

Figure 1:
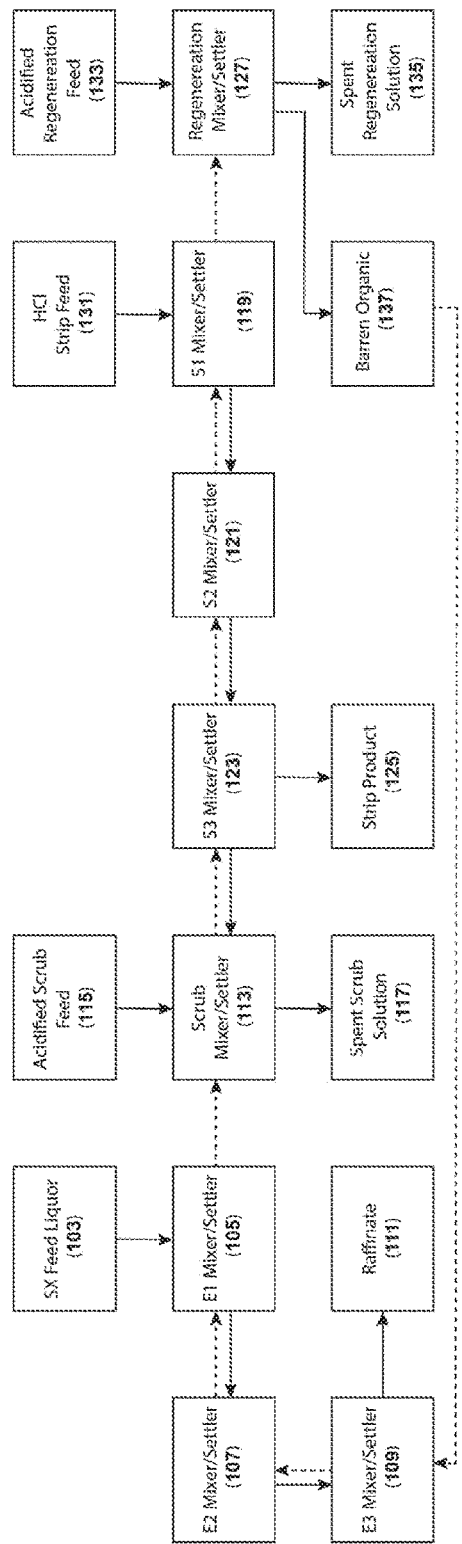
FIG. 1 is a flowchart of an embodiment of a scandium solvent extraction process in accordance with the teachings herein.
Figure 2:
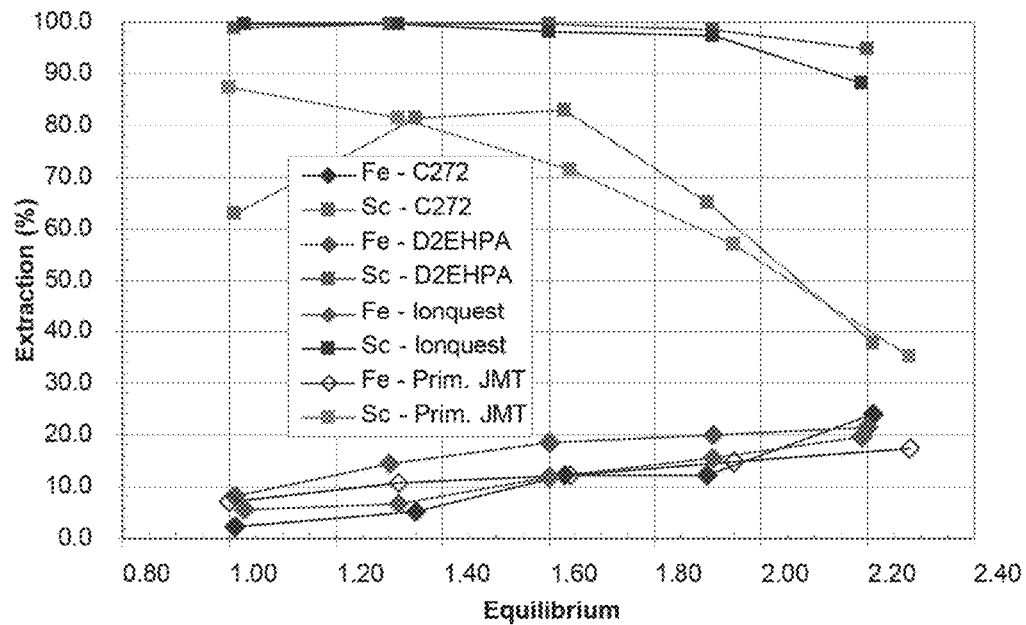
FIG. 2 is a graph of pH isotherms of scandium and iron for four different organic stripping systems.

Scandium production is further hampered by the significant challenges attendant to isolating the metal from other metals which commonly occur with it, both in natural mineral formations and in the tailings, sludges or byproducts from other metal recovery operations or industrial processes. In particular, scandium has chemical and physical properties which are similar to some other metals, such as thorium, zirconium and titanium. Consequently, many of the methods, systems and materials commonly used in the art to isolate metals do not yield pure samples of scandium in sufficiently high yields. This may be due, for example, to insufficient selectivity (with respect to scandium) of the chelating agents, binders or resins utilized to isolate scandium in these processes, or to problems in releasing scandium from these chelating agents, binders or resins after extraction has occurred. Unfortunately, since the concentration of scandium in most starting materials is relatively low to begin with, the use of low yield processes in isolating scandium from such materials is a significant cost multiplier, thus rendering the use of such processes commercially impractical.

In addition, many of the processes developed in the art for the recovery of scandium, and the chemistry and materials they depend on, are not suitable for use at highly acidic pHs (e.g., at pHs of less than 1). However, it has been found that pHs in this range are often conducive to leaching scandium from laterite ores and other scandium sources. Unfortunately, subsequent reduction of the pH of the leachate to accommodate these processes frequently leads to precipitation of some of the extracted scandium values, thus adversely affecting yield.

There is thus a need in the art for systems and methodologies for recovering scandium from a starting material or solution containing multiple metals. In particular, there is a need in the art for systems and methodologies for recovering scandium from such materials or solutions, and there is also a need in the art for such systems and methodologies which are highly selective to scandium and which produce scandium in high purity and high yields. There is further a need in the art for a method for recovering scandium values which may be utilized in conjunction with solutions having highly acidic pHs (e.g., pHs less than 1). These and other needs may be met by the systems and methodologies disclosed herein.

In a preferred embodiment, the methodologies disclosed herein, and the systems based on these methodologies, feature a scandium extraction step and a stripping step. In the scandium extraction step, scandium values are extracted from a scandium source with an organic solvent, thereby obtaining a scandium-loaded organic solvent. The scandium source may be, for example, a leachate, an industrial byproduct, or a metal sludge, and will typically contain both scandium and iron ions, in addition to other metal ions. The organic solvent preferably contains an amine, which is preferably a primary amine. Scandium values may then be stripped from the scandium-loaded organic solvent with a stripping solution containing an acid and a salt. In a preferred embodiment, the stripping solution contains hydrochloric acid and sodium chloride.

FIG. 1 is a flowchart depicting a first particular, non-limiting embodiment of a system (and associated methodology) for recovering scandium in accordance with the teachings herein. In this flowchart, the dashed lines indicate the flow of organic solvent through the system, while the opposing lines indicate the flow of aqueous media through the system.

Scandium metal enters the system 101 as a solvent extraction feed liquor 103, a scandium-bearing organic solution which may be obtained by performing solvent extraction on a variety of sources. For example, the solvent extraction feed liquor 103 may be obtained by performing solvent extraction on a leachate derived from a leaching process such as a high pressure acid leach (HPAL) process, an acid bake process, or an atmospheric pressure acid leach process. The solvent extraction feed liquor 103 may also be obtained by performing solvent extraction on a byproduct from another industrial process such as a metal refining operation, or by performing solvent extraction on solutions obtained by leaching or otherwise treating such a byproduct. By way of specific example, the solvent extraction feed liquor 103 may be obtained by performing solvent extraction on metal sludges, on byproducts from the treatment of tungsten or uranium tailings, on waste streams resulting from the processing of titanium-containing ores and concentrates into titanium dioxide pigments, or on red mud, a waste product of the Bayer process used to refine bauxite into alumina.

The system 101 is equipped with first 105, second 107 and third 109 mixers/settlers. Each of these mixers/settlers is a phase separation chamber in which the organic and aqueous phases are vigorously mixed and then allowed to settle so that phase separation can occur. Preferably, these mixers/settlers take the form of a tank equipped with a suitable agitator and with inlets and outlets for the aqueous and organic phases. After vigorous agitation, the solution in each tank is allowed to settle and undergo phase separation, after which the phases are separately decanted off.

As indicated in the drawing, the aqueous content of the feed liquor 103 moves through the first 105, second 107 and third 109 mixers/settlers in succession, and exits the third mixer/settler 109 as a raffinate 111. Similarly, the organic content of the feed liquor 103 moves successively (and in the opposite direction of the aqueous content of the feed liquor 103) through the third 109, second 107 and first 105 mixers/settlers, and then onto the scrub mixer/settler 113.

In the scrub mixer/settler 113, the scandium-bearing organic phase is subjected to scrubbing with an acidified scrub feed 115. The acidified scrub feed 115 is an acidic solution used to scrub the feed liquor 103. In a preferred embodiment, the acidified scrub feed 115 contains sulfuric acid, though embodiments are possible in which the acidified scrub feed 115 contains one or more sulfates instead of, or in addition to, sulfuric acid. Such scrubbing may be useful in some embodiments to, for example, reduce the iron content of the feed liquor 103. The aqueous component then exits the scrub mixer/settler 113 as spent scrub solution 117, while the organic component from the scrub mixer/settler 113 is passed successively to the third 123, second 121 and first 119 mixer/settlers.

The scandium content of the scandium-bearing organic phase is then stripped with an HCl strip feed 131, which is preferably an aqueous HCl/$MgCl_2$ solution, in the first 119, second 121 and third 123 mixers/settlers. Each of these mixer/settlers is a phase separation chamber in which the organic and aqueous phases are vigorously mixed and then allowed to settle so that phase separation can occur. Each mixer/settler is preferably equipped with an agitator and with inlets and outlets for the organic and aqueous phases. The scandium concentration in the resulting aqueous strip product 125 is significantly increased compared to the scandium concentration in the original feed liquor 103. The strip product 125 may then be subsequently processed to yield scandium metal, scandium oxide ($Sc_2O_3$), a scandium-bearing alloy, or another desired scandium-bearing product.

The use of $MgCl_2$ in the HCl strip feed 131 provides some significant advantages over some other salts such as NaCl. Amine type solvents such as Primene JMT, which are desirable to use as extractants in the systems and methodologies described herein (see examples below), typically require an anion in the solvent (such as, for example, bisulfate) to load scandium. Given the low pHs which are preferably utilized in the leach solutions disclosed herein, there is generally a sufficient concentration of bisulfate anions in equilibrium with sulfuric acid for scandium loading purposes. This sulfate content is stripped from the organic extractant along with scandium, and reports to the solvent extraction loaded strip liquor (LSL). However, if a salt such as NaCl is used in the HCl strip feed 131 and the concentration of sulfate is sufficiently high, then the LSL will also contain a significant concentration of $Na^+$ ions. This situation can induce the formation of scandium oxalate double salts when (as is preferred) oxalate is used to precipitate scandium from the scandium loaded LSL, thus significantly reducing the purity of the scandium oxalate obtained. This problem is mitigated, if not avoided altogether, by the use of $MgCl_2$. As an added benefit, $MgCl_2$ is found to effectively decrease the effective pH of concentrated chloride solutions from the levels that pure HCl solutions produce. This, in turn, allows the use of stripping solutions with lower concentrations of HCl.

When the stripping solution comprises HCl and NaCl, the concentration of HCl in the stripping solution is typically at least 2M, preferably at least 2.5M, and more preferably at least 3M. The molar ratio of HCl to NaCl is preferably within the range of 1 to 2, more preferably in the range of 1.25 to 1.75, and most preferably about 1.5. When the stripping solution comprises HCl and $MgCl_2$, the concentration of HCl in the stripping solution is typically at least 0.1M, and preferably at least 0.25M. When the stripping solution comprises HCl and $MgCl_2$, the concentration of HCl in the stripping solution is typically greater than 0.1M but less than 2.5M, is preferably within the range of 0.25M to 1M, is more preferably within the range of about 0.3M to about 0.7M, and is most preferably about 0.5M. The molar ratio of HCl to NaCl is preferably within the range of 1 to 2, more preferably in the range of 1.25 to 1.75, and is most preferably about 1.5.

The stripped organic phase is passed to a regeneration mixer/settler 127, where it is treated with an acidified regeneration feed 133. The regeneration mixer/settler 127 is a phase separation chamber in which the organic and aqueous phases are vigorously mixed and then allowed to settle so that phase separation can occur. The regeneration mixer/settler 127 is equipped with an agitator to vigorously mix the stripped organic phase and the acidified regeneration feed 133, and is further equipped with an inlet, a first outlet for the spent regeneration solution 135, and a second outlet for the regenerated, barren organic phase 137. The barren organic phase 137 is then recycled to the third mixer/settler 109.

It will be appreciated that several modifications are possible to the system and process depicted in FIG. 1 to accommodate various feedstocks or to obtain various process objectives. For example, various additional steps may be incorporated into the process. For example, one or more steps may be added to the process reduce the initial concentration of iron or other metals in the feedstock, to adjust the pH of the feedstock, or to remove or reduce the concentration of organic contaminants or particular metals in the feedstock. Moreover, the number of mixers/settlers may be increased or decreased to optimize the process, increase its efficiency, or make it more cost effective.

The systems and methodologies disclosed herein may be further appreciated with respect to the following particular, non-limiting examples. In these examples, the following materials and procedures are utilized.

Feed Solutions

The feed solutions set forth in TABLE 1 below were utilized in the following examples. These feed solutions are typical of the leachates commonly encountered in the acid leaching of scandium bearing laterite ores.

TABLE 1

| Chemical Composition of Feed Solutions | | | | | | | | | |
|---|---|---|---|---|---|---|---|---|---|
| Sample | Metal Concentration (mg/L) | | | | | | | | |
| Solution | Al | Co | Cr | Fe | Mg | Mn | Ni | Sc | Ca |
| 2 L (M) | 2476 | 6.76 | 10.1 | 49.2 | 213 | 431 | 8.87 | 22 | — |
| 230 L (C) | 5023 | 8 | 23 | 401 | 265 | 467 | 32 | 24 | 257 |
| 230 L (P) | 5115 | 9.3 | 38.1 | 2127 | 241 | 524 | 33 | 27 | 188 |

Extractants

The extractants in TABLE 2 below were used in the examples disclosed herein.

TABLE 2

| Extractants | | | | |
|---|---|---|---|---|
| Trade Name/ Designation | Chemical Name | Description | Chemical Structure | |
| Cyanex 272 | Di-2,4,4-trimethylpentyl phosphinic acid | An organo-phosphorous acid extractant | $$HO-\overset{\overset{O}{\|}}{\underset{CH_2CH(CH_3)CH_2(CH_3)_2CCH_3}{P}}-CH_2CH(CH_3)CH_2(CH_3)_2CCH_3$$ | |
| Ionquest 801 | 2-ethylhexyl phosphonic acid mono-2-ethylhexyl ester | An organo-phosphorous acid extractant | $$HO-\overset{\overset{O}{\|}}{\underset{OCH_2CH(C_2H_5)(CH_2)_3CH_3}{P}}-CH_2CH(C_2H_5)(CH_2)_3CH_3$$ | |
| D2EHPA | di-2-ethylhexyl phosphoric acid | An organo-phosphorous acid extractant | $$HO-\overset{\overset{O}{\|}}{\underset{OCH_2CH(C_2H_5)(CH_2)_3CH_3}{P}}-OCH_2CH(C_2H_5)(CH_2)_3CH_3$$ | |

TABLE 2-continued

Extractants

| Trade Name/ Designation | Chemical Name | Description | Chemical Structure |
| --- | --- | --- | --- |
| Versatic 10 Acid | 2-methyl-2-ethylheptanoic acid | A carboxylic acid extractant | $H_5C_2-\underset{\underset{CH_3}{\|}}{\overset{\overset{COOH}{\|}}{C}}-C_5H_{11}$ |
| LIX63 | 5,8-diethyl-7-hydroxy-6-dodecanone oxime | A hydroxyoxime extractant | $H_3C(H_2C)_3(H_5C_2)HC-\underset{HON}{C}-CH-CH(C_2H_5)(CH_2)_3CH_3$ with OH |
| LIX54-100 | β-diketone hydroxyoxime | A hydroxyoxime extractant | $R_1$-phenyl-$C(=O)-CH_2-C(=O)-R_2$ |
| LIX84 | 2-hydroxy-5-nonylacetophenone | A hydroxyoxime extractant | $C_9H_{19}$-phenyl(OH)-C(CH_3)=NOH |
| LIX860 | 5-dodecylsalicyl-aldoxime | A hydroxyoxime extractant | $C_{12}H_{25}$-phenyl(OH)-CH=NOH |
| LIX984 | See above | A mixture of LIX860 and LIX84 at a 1:1 ratio | See above |
| Primene JMT | 1,1,3,3,5,5,7,7,9,9-decamthyl decyl amine | An amine extractant | $\begin{matrix}C_9H_{19}\text{-}C_{11}H_{23}\\ \phantom{xx}\diagdown\\ \phantom{xxxx}CH-NH_2\\ \phantom{xx}\diagup\\ C_9H_{19}\text{-}C_{11}H_{23}\end{matrix}$ |
| N1923 | | A primary amine extractant | $R_1-\underset{\underset{R_3}{\|}}{N}-R_2$ where $R_1 = R_2 = R_3 = CH_3(CH_2)_7-$ |
| TBP | Tri-butyl phosphate | A phosphoric ester neutral extractant | Tributyl phosphate structure |

TABLE 2-continued

Extractants

| Trade Name/Designation | Chemical Name | Description | Chemical Structure |
|---|---|---|---|
| TOA (Alamine 336) | Tri-octyl amine | A tertiary amine extractant | 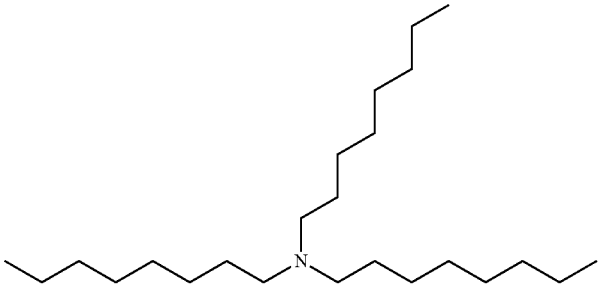 [SMILES: CCCCCCCCN(CCCCCCCC)CCCCCCCC] |

Diluents

The diluents in TABLE 3 below were used in the examples disclosed herein.

TABLE 3

Diluents

| Tradename | Decription | Chemical Description |
|---|---|---|
| Shellsol D70 | 100% aliphatic | Petroleum naptha |
| Shellsol 2046 | 81% aliphatic, 19% aromatic | Kerosine (petroleum), hydrodesulfurized |
| Shellsol A200 | 100% aromatic | Aromatic hydrocarbon |

The following procedures are referenced in the examples disclosed herein. Extraction pH Isotherm Tests All the tests were carried out in 0.5 liter stainless steel rectangular boxes or glass jars immersed in a temperature controlled water bath. Glass jars were used if an HCl solution was involved. Eurostar digital overhead stirrers and 30 mm diameter plastic impellers were used for mixing. The solution temperature was maintained at 40° C. during the tests. The A/O ratio in pH isotherm tests was 5. The aqueous solution pH was continuously monitored using a ROSS Sure Flow electrode (model 8172BN) coupled to a Hanna portable pH meter (model HI9025), and pH adjustments were made by addition of dilute sodium hydroxide or ammonia solutions, or by addition of sulfuric acid or hydrochloric acid solutions.

The systems were allowed to be equilibrated sufficiently at each pH point before sampling. Generally, equilibrium was considered to be approached if the pH variation of the second decimal digits was less than one in two minutes. After the system reached equilibrium, the solution mixture (20 mL) was sampled at 0.3-0.5 pH intervals over a pH range of 0.5-2.5 using a 20 mL syringe with a plastic tube extension. Only aqueous samples were assayed.

Stripping Acidity Isotherms Tests

The organic solution was loaded by mixing with the feed solution at an A/O ratio of 5, 40° C. and a selected pH depending on the extractant. The loaded organic solution and a number of HCl strip solutions with different acidities were mixed separately at an A/O ratio of 1:2 and 40° C. The solution mixture samples (20 mL) were taken using a 20 mL syringe after the system was equilibrated for 5 minutes. Only aqueous samples were assayed.

Extraction Kinetic Tests

For determination of extraction kinetics, the organic solution was loaded and the amount of base used for the pH adjustment was recorded. The organic solution was equilibrated by mixing with the amount of base recorded. Timing was started immediately when the equilibrated organic solution was mixed with the feed solution at an A/O ratio of 5 and 40° C. The solution pH was monitored throughout the tests and adjusted if necessary. The mixtures were sampled for assay at 0.5, 1.0, 2.0, 3.0, 5.0 and 10.0 minutes of mixing using 20 mL syringes.

Stripping Kinetic Tests

For determination of stripping kinetics, timing was started immediately when the loaded organic solution was mixed with the strip solution. The mixtures were sampled for assay at 0.5, 1.0, 2.0, 3.0, 5.0 and 10.0 minutes of mixing using 20 mL syringes.

Phase Disengagement Tests

To determine phase disengagement times (PDTs) under extraction conditions, the organic solution was first loaded, and then the two phases were separated in a separation funnel for two hours before PDT testing under extraction conditions. To determine phase disengagement times under stripping conditions, the loaded organic solution was mixed with the strip solution at an A/O ratio of 1:2 and 40° C. The two phases were then separated in a separation funnel for two hours before PDT testing under stripping conditions.

The phase disengagement time was measured for both aqueous continuous (A/C) and organic continuous (O/C) modes. To achieve A/C mode, the aqueous solution (100 mL) was placed in the mixing box (7 cm×7 cm base and 10 cm height) and stirred for two minutes at 1400 rpm. Then, the organic solution (20 mL) was added within 3-5 seconds. Mixing was stopped after exactly one minute. The emulsion was rapidly transferred to a 250 mL measuring cylinder and timing was started simultaneously. The separation of the two phases was monitored by recording the time required for every 10 mL increment of clear aqueous phase and for each 2 mL increment of clear organic phase. Timing was stopped when 90% of the clear organic and aqueous phases were achieved. For achieving O/C mode, the organic solution was stirred first. The other procedures were the same as for the A/C mode. Each test was duplicated or triplicated to achieve PDT readings within 10% relative standard deviation (RSD) using freshly prepared aqueous and organic solutions.

Chemical Analysis

The two phases of the solution mixture samples taken were separated through a Whatman 1PS filter paper. The aqueous phase of each sample was, again, filtered through a 0.45 μm Supor membrane filter. Some organic samples were stripped at 40° C. with 2 M HCl at an A/O ratio of 2:1. The loaded strip liquors and the aqueous samples were assayed for metals using ICP-AES.

Comparative Example 1

This example is reproduced from Michael D. Odekirk and Donna D. Harbuck, "SCANDIUM SOLVENT EXTRACTION FROM LIQUORS PRODUCED BY LEACHING SULFATED TANTALUM TAILINGS", The Minerals, Metals & Materials Society (1992).

Four known scandium extraction systems were tested for their ability to extract scandium. These systems included the basic extractant decamethyl decylamine (Primene JMT), the solvating extractant tri-n-butyl phosphate (TBP), and the acidic extractant di(2-ethylhexyl) phosphoric acid (DEHPA), as well as the chelating extractant LIX 64N (a mixture of 2-hydroxy-5-nonylbenzophenone oxime and 5,8-diethyl-7-hydroxyl-6 dodecanone oxime). Single contact batch tests were conducted in separatory funnels on a wrist action shaker for 30 min using aqueous to organic (A:O) ratios of 1:1. All extractants were diluted with industrial grade kerosene to 10 volume percent for testing. TABLE 4 shows the extractants tested, classification type, and metal extraction.

TABLE 4

Metals Extraction Results (%)

| Extractant | Type | Ta | Zr | Nb | Sc | Y | Fe |
|---|---|---|---|---|---|---|---|
| DEHPA | Acidic | 2.2 | 60.0 | 1.0 | 99.7 | 1.2 | 2.8 |
| LIX 64N | Chelating | 0.0 | 0.3 | 0.5 | 0.1 | 0.1 | 0.0 |
| TBP | Solvating | 0.3 | 0.1 | 0.0 | 0.1 | 0.0 | 0.0 |
| Primene JMT | Basic | 0.4 | 33.8 | 0.0 | 0.1 | 0.0 | 0.0 |

As the results in TABLE 4 indicate, the acidic extractant DEHPA was the only organic extractant that demonstrated scandium extraction capabilities under the conditions tested.

Example 1

This example provides preliminary batch extraction results for the extraction systems set forth in TABLE 2.

The extractants of TABLE 2 (see above) were tested at two pH values (1.05 and 1.55) and two A/O ratios (5:1 and 10:1) for metal pH isotherms with the 2 L feed solution. The better performers in terms of scandium extraction are summarized in TABLE 5 below.

TABLE 5

Preliminary Batch Extraction Results

| | | | Extraction (%) | |
|---|---|---|---|---|
| Organic System | Aqueous/Organic | pH | Fe | Sc |
| 3% Cyanex 272 | 5/1 | 1.48 | 7.7 | 99.1 |
| 3% Cyanex 272 | 10/1 | 1.5 | 1.8 | 97.0 |
| 3% Cyanex 272 + 1% TOA | 5/1 | 1.5 | 1.8 | 91.7 |
| 3% Cyanex 272 + 1% TBP | 5/1 | 1.51 | 3.2 | 98.3 |
| 3% Ionquest 801 | 5/1 | 1.04 | 40.8 | >99.5 |
| 3% Ionquest 801 + 1% TBP | 5/1 | 1.04 | 29.6 | >99.5 |
| 3% DE2HPA | 5/1 | 1.04 | 47.7 | >99.5 |
| 3% DE2HPA + 1% TBP | 5/1 | 1.05 | 32.3 | >99.5 |

TABLE 5-continued

Preliminary Batch Extraction Results

| | | | Extraction (%) | |
|---|---|---|---|---|
| Organic System | Aqueous/Organic | pH | Fe | Sc |
| 3% Primene JMT | 5/1 | 2 | 55.1 | 99.5 |
| 3% N1923 | 5/1 | 2 | 44.4 | 99.5 |

Although not shown in TABLE 5, all of the organic systems tested extracted little or no Al, Co, Cr, Mg, Mn and Ni. Four of the systems showed very low scandium extraction, including the three hydroxyoxime extractants (LIX63, LIX54 and LIX984N) and the carboxylic extractant Versatic 10 acid.

The four organic systems containing Ionquest 801 and D2EHPA, either as a single extractant or combined with TOA and TBP, strongly extracted scandium. However, they also strongly extracted iron, as shown in TABLE 5.

Amongst the 12 organic systems tested, all systems containing Cyanex 272 performed well, especially at pH 1.5. The scandium extraction reached 91.7-98.3% and the iron extraction was in the range of 1.8-7.7% for the three Cyanex 272 systems tested. Lowering the extraction pH from 1.5 to 1.0 largely decreased the scandium extraction. Increasing A/O ratio from 5:1 to 10:1 decreased the scandium extraction to some degree, but also decreased the iron extraction (an example of this is set forth in TABLE 5).

The two primary amine extractants (Primene JMT and N1293) performed well with scandium extraction of 99.5%. However, they also strongly extracted iron (see TABLE 5) in the tested pH range.

These preliminary extraction results suggested that the three organo-phosphorus extractants, Cyanex 272, Ionquest 801 and D2EHPA and the two primary amine extractants Primene JMT and N1923 performed well. Although N1923 also performed well, it was not further tested because both Primene JMT and N1923 are quite similar as primary amines. Therefore, the four organic extractants Cyanex 272, Ionquest 801, D2EHPA and Primene JMT were further tested in terms of scandium extraction.

Example 2

The four potential extractants above with 3% concentration each were tested for metal pH isotherms at an A/O ratio of 5:1 and 40° C. using the 230 L feed solution (FIGS. 7-10). Except for scandium and iron, all metal extractions in the pH range tested were very low or were negligible. The extractions of scandium and iron with the four organic systems tested are compared in FIG. 11. While D2EHPA was the strongest extractant for scandium, it was also the strongest extractant for iron.

The scandium extraction with the four extractants above pH 1.3 was found to be in the order:

D2EHPA>Ionquest 801>Cyanex 272>Primene JMT

The scandium extraction below pH 1.3 was found in the order of:

D2EHPA>Ionquest 801>Primene JMT>Cyanex 272

The change in the scandium extraction order was caused by the decreasing scandium extraction with Cyanex 272 and the increasing scandium extraction with Primene JMT below pH 1.3. It is to be noted that the scandium extraction with Cyanex 272 showed a maximum between pH 1.3-1.7, while that with Primene JMT showed an increase trend with decreasing pH in the pH range tested. The scandium extraction was very strong with D2EHPA and Ionquest 801 with almost complete extraction below pH 1.4.

The iron extraction with the four extractants was found in the order of:

D2EHPA>Ionquest 801 z Primene JMT>Cyanex 272.

Comparing the performance of Cyanex 272 in the current tests with that in the preliminary tests, it was found that the scandium extraction was much lower in the current tests. This may have resulted from the much higher iron concentration in the 230 L feed solution in the current tests.

Compared the performance of the four extractants, Cyanex 272 was the best performer in terms of relatively high scandium extraction and low iron extraction. Therefore, Cyanex 272 was chosen as the extractant for the next stage of test work.

Example 3

The stripping acidity isotherms with Cyanex 272 were investigated. The organic system containing 3% Cyanex 272 in Shellsol D70 was loaded at an A/O ratio of 5:1, pH 1.53 and 40° C. The loaded organic solution contained 108 mg/L Sc and 2084 mg/L Fe, suggesting a scandium extraction of 83% and iron extraction of 20% by taking A/O ratio of 5:1 into account.

Example 4

The stripping acidity isotherms with Cyanex 272 were investigated using $H_2SO_4$, HCl and $HNO_3$ in various concentrations, and using Shellsol D70 as the diluent.

The organic system containing 3% Cyanex 272 in Shellsol D70 was loaded at an A/O ratio of 5:1, pH 1.53 and 40° C. The loaded organic solution contained 108 mg/L Sc and 2084 mg/L Fe, suggesting a scandium extraction of 83% and iron extraction of 20% by taking A/O ratio of 5:1 into account.

Three acids ($H_2SO_4$, HCl and $HNO_3$) with 2, 4, 6 and 8 M concentrations were used as strip solutions. The stripping of scandium and iron at A/O ratios of 1:2 and 1:4 is shown in FIGS. 23 and 24, respectively. It was found that:

the stripping of scandium was slightly higher with the A/O ratio of 1:2 than that with the A/O ratio of 1:4, likely due to more available acid;

HCl and $HNO_3$ performed poorly in stripping scandium;

the stripping of scandium with $H_2SO_4$ showed a peak at 2M concentration with a maximum stripping efficiency of 72%; and $H_2SO_4$ stripped the iron completely, even at a concentration of 0.5M.

Based on these results, it was concluded that the stripping of scandium from the loaded Cyanex 272 was not satisfactory. Therefore, it was necessary to test other extractants, including Ionquest 801, D2EHPA and Primene JMT.

Example 5

This example demonstrates the stripping of Ionquest 801, D2EHPA and Primene JMT systems with very strong sulfuric and hydrochloric acid solutions.

Three organic systems (3% Ionquest 801, 3% D2EHPA and 3% Primene JMT in Shellsol D70) were loaded at an A/O ratio of 5:1 and 40° C. The loaded pH for the Ionquest 801 and D2EHPA system was 2.0, and that for the Primene JMT system was 0.5. The loaded organic systems were stripped with 8M $H_2SO_4$ and 6 M HCl at an A/O ratio of 1:10 and 40° C. The results are shown in Table 6.

TABLE 6

Extraction and Stripping with Different Organic Systems

| Organic System | Extraction (%) | | Stripping (%) 8M $H_2SO_4$ | | Stripping (%) 6M HCl | |
| --- | --- | --- | --- | --- | --- | --- |
| | Sc | Fe | Sc | Fe | Sc | Fe |
| 3% Ionquest | 86.3 | 18.6 | 0.0 | 6.4 | 0.1 | 100.0 |
| 3% D2EHPA | 97.1 | 21.6 | 0.2 | 3.5 | 0.0 | 100.0 |
| 3% Primene JMT | 93.3 | 4.4 | 2.2 | 53.9 | 91.7 | 100.0 |

At pH 2.0, both Ionquest 801 and D2EHPA systems extracted large amounts of iron (over 18% for Ionquest 801, and over 21% for D2EHPA). With both 8M $H_2SO_4$ and 6M HCl strip solutions, the stripping of scandium was very low for both Ionquest 801 and D2EHPA systems (only 0.01-0.18% Sc was stripped), thus suggesting that these two systems are not good candidates for scandium purification if the foregoing acids are used as stripping solutions. As stated in the previous sections, stripping with alkaline and HCl and $HNO_3$ solutions do not appear to be suitable either.

The only good performer was Primene JMT. At pH 0.5, over 93% Sc was extracted and only 4.4% Fe was extracted. With 6 M HCl, over 91% Sc and 100% Fe were stripped in a single contact. In a counter-current operation, the scandium extraction and stripping could be almost complete if 2-3 stages are used. These results showed that Primene JMT was the best performer in terms of extraction and stripping of scandium and the rejection of iron.

One of the more interesting findings was the enhanced loading of scandium on Primene JMT as the pH of the leach solution is decreased, decreasing the iron loading at the same time. For a solution with a pH of about 0.4 the scandium and the iron loading can be estimated by extrapolation.

A pH of about 0.4 metal loadings can be estimated for the HPAL leach solution and a pH of 1.5 was optimum for the acid bake process. The efficiency of the Primene JMT loading for both routes is shown in TABLE 7 below.

TABLE 7

Efficiency of 3% Primene JMT in Shellsol D70 at an A/O of 5:1 and 40° C.

| Parameter | HPAL | Acid Bake |
| --- | --- | --- |
| Leach Solution pH | 0.4 | 1.5 |
| Sc Loading (%) | 93.6 | 74.1 |
| Fe Loading (%) | 4.9 | 11.3 |

Example 6

Figure 3:
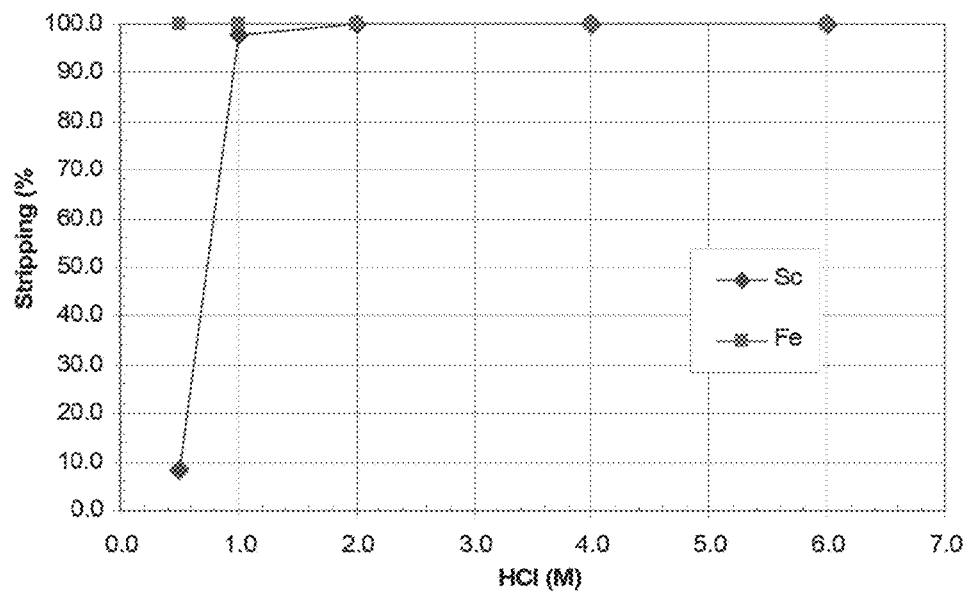
FIG. 3 is a graph of scandium and iron stripping acidity isotherms for an organic solution containing 3% Primene JMT in Shellsol D70 at an A/O ratio of 5:1 and 40° C.
Figure 4:
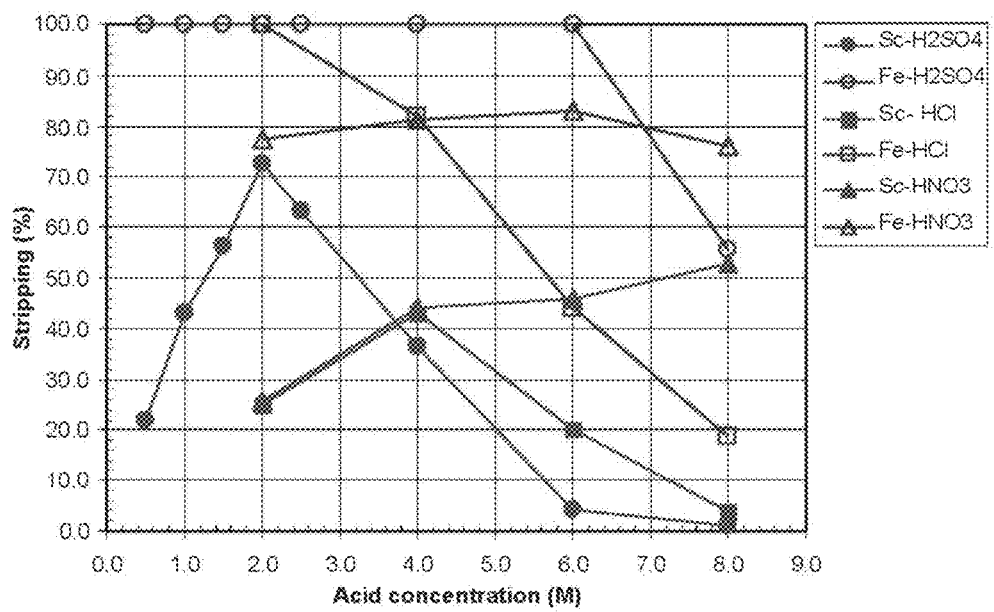
FIG. 4 is a graph of stripping of a loaded 3% Cyanex 272 organic system with different acids and acidities at an A/O ratio of 1:2 and 40° C.
Figure 5:
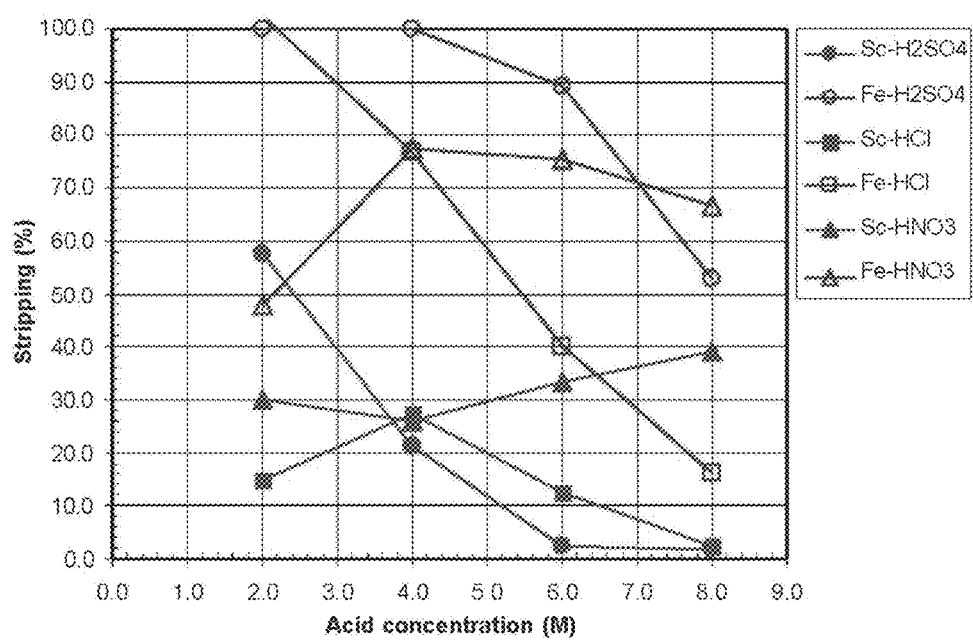
FIG. 5 is a graph of stripping of a loaded 3% Cyanex 272 organic system with different acids and acidities at an A/O ratio of 1:4 and 40° C.
Figure 6:
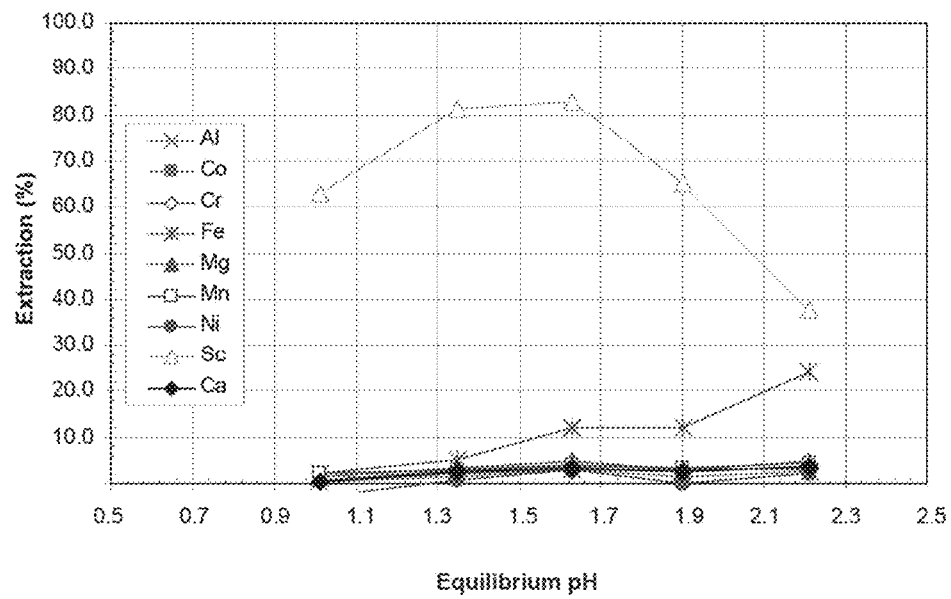
FIG. 6 is a graph of metal pH isotherms with 3% Cyanex 272 in Shellsol D70 at A/O 5:1 and 40° C.
Figure 7:
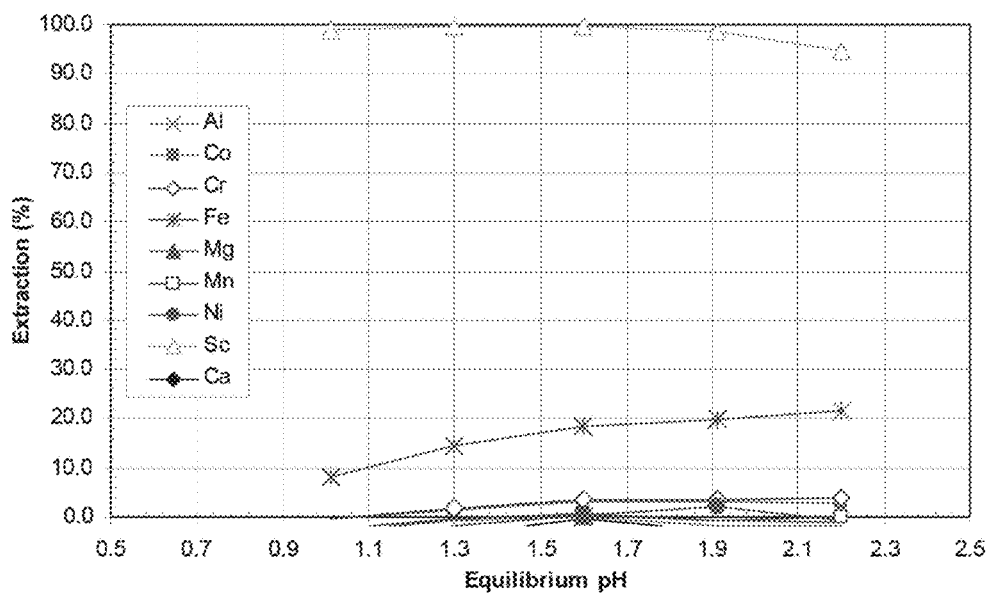
FIG. 7 is a graph of metal pH isotherms with 3% Ionquest 801 in Shellsol D70 at A/O 5:1 and 40° C.
Figure 8:
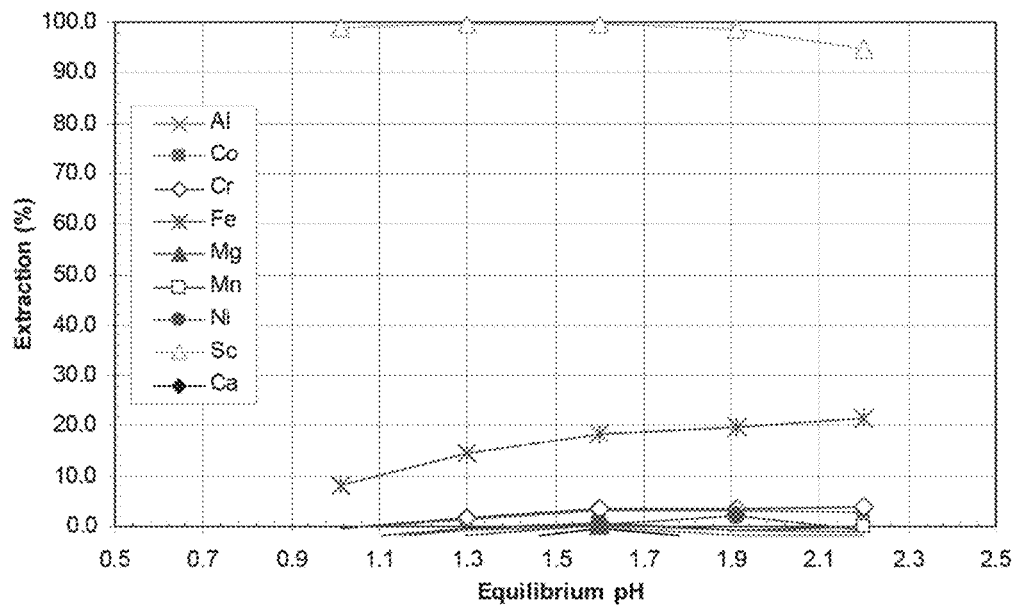
FIG. 8 is a graph of metal pH isotherms with 3% D2EHPA in Shellsol D70 at A/O 5:1 and 40° C.
Figure 9:
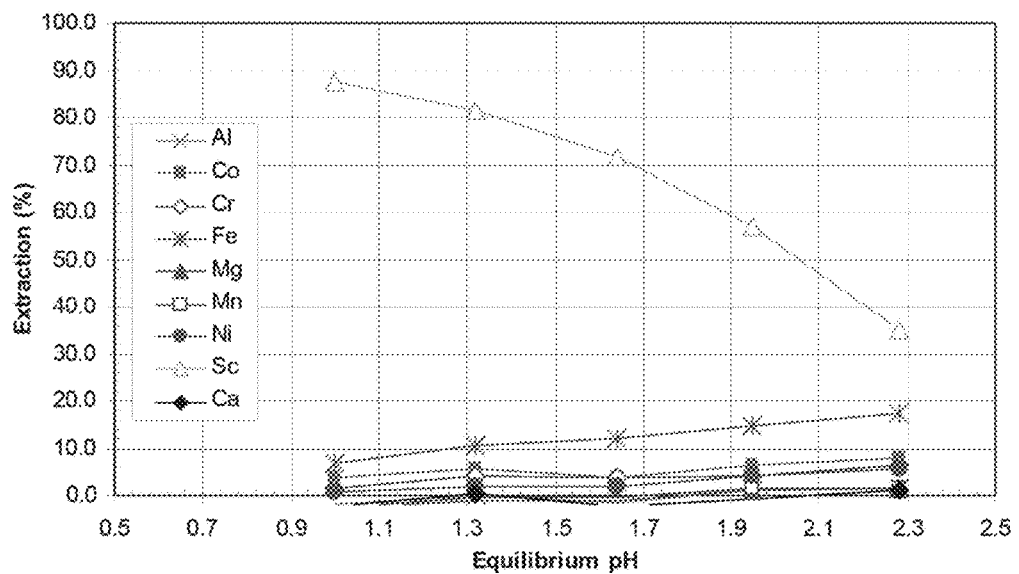
FIG. 9 is a graph of metal pH isotherms with 3% Primene JMT in Shellsol D70 at A/O 5:1 and 40° C.
Figure 10:
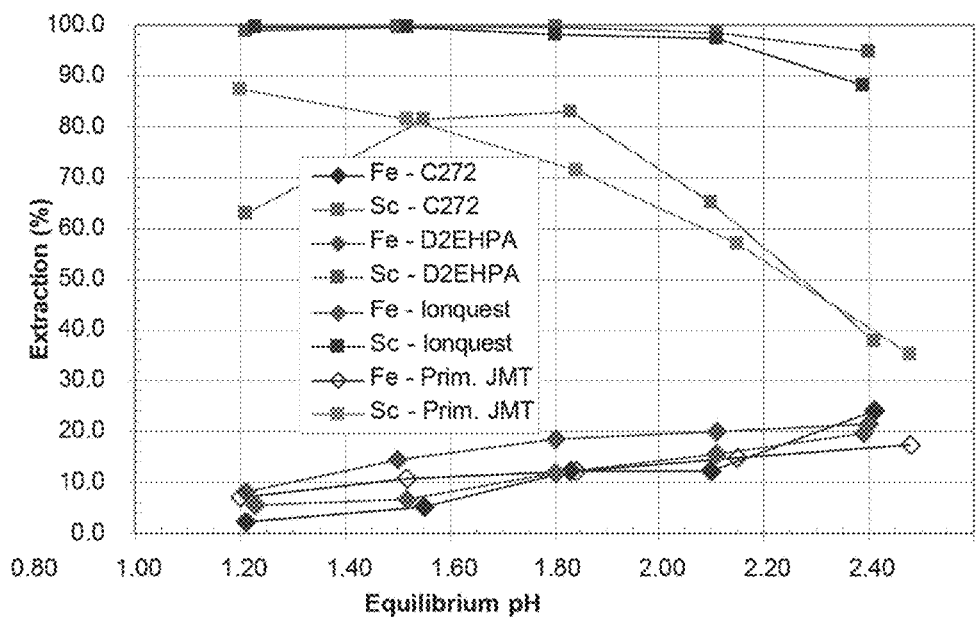
FIG. 10 is a graph of pH isotherms of scandium and iron with four organic systems Cyanex 272, Ionquest 801, D2EHPA and Primene JMT.

The stripping of scandium and iron from the loaded organic solution containing 3% Primene JMT in Shellsol D70 was conducted using 0.5, 1.0, 2.0, 4.0 and 6.0 M hydrochloric acid solutions. The results are depicted in the graph of FIG. 3, which depicts scandium and iron stripping acidity isotherms with an organic solution containing 3% Primene JMT in Shellsol D70 an A/O ratio of 5:1 and 40° C. It was found that, for these tests, all of the acidities over 1.0 M HCl worked well to strip scandium and iron.

Example 7

This example demonstrates the effect of sodium chloride on scandium stripping.

It has been reported that the addition of NaCl in an HCl solution can improve the stripping of scandium from loaded Primene JMT organic solution (Rose and Rosenbaum, 1962). Two tests were conducted with the addition of NaCl to obtain two strip solutions consisting of 1.0 M HCl/2.0 M NaCl and 0.5 M HCl/2.0 M NaCl. The test results are shown in TABLE 8 below.

TABLE 8

Stripping Efficiency

| | Stripping Efficiency (%) | | | |
|---|---|---|---|---|
| Element | 1.0M HCl | 1.0M HCl, 2.0M NaCl | 0.5M HCl | 0.5M HCl, 2.0M. NaCl |
| Fe | 100 | 100 | 100 | 100 |
| Sc | 97.8 | 100 | 8.3 | 98.4 |

It is clear that the addition of NaCl dramatically improved the stripping of scandium with the strip solution containing 0.5M HCl. The stripping efficiency increased from 8.26% to 98.4% with the addition of 2.0M NaCl. This would result in significant savings of acids and base in practice, since the precipitation of scandium would be performed in the pH range of 1.7-2.0 in the precipitation step with oxalic acid. However, as noted previously, the use of NaCl may be disadvantageous in situations where oxalate is used to precipitate Sc from the LSL under conditions that are conducive to the formation of double salts.

Example 8

Further laboratory studies were conducted to examine the behavior of scandium stripping from loaded decamethyl decylamine JMT organic solvent. These experiments provided an initial indication of the amine's stripping characteristics, as well as the required strength of the strip solution. After loading freshly prepared organic solvent with several contacts of leach liquor at 10:1 A/O ratios, the loaded organic was then stripped at a variety of A/O ratios.

The initial strip solutions consisted of 2-6 M HCl. Both aqueous-continuous and organic-continuous bench-scale mixing tests were performed. The preferred phase continuity was found to be aqueous, rather than organic, in the stripping mixers. It was determined that the aqueous and organic phases separated readily with an aqueous-continuous phase. An organic-continuous phase would have been preferred to minimize or eliminate aqueous recycle from the settlers to the strip mixers. The results of these tests suggested that aqueous recycle loops would be needed in a SX pilot plant implementation of the process.

The initial strip tests with 2-6 M HCl indicated that the scandium did not readily strip from the loaded organic solvent, and an A/O ratio of greater than 1:1 was needed for effective stripping. Subsequent strip tests with 1.5M HCl and 2M NaCl showed some improvement, but the strip solution was saturated with NaCl at these concentrations. Later tests with 3M HCl and 2M NaCl showed improved stripping performance, although not ideal at an A/O ratio of 1:1. The single-contact strip test results are shown in TABLES 9 and 10 below. As seen therein, the Primene JMT system did not strip well using the 1.5 M HCl strip solution.

After varying the A/O ratio from 0.1:1 to 1:1, the highest strip recovery achieved with the 1.5 M HCl strip solution was 16.7% at a 1:1 A/O ratio. However, when the concentration of HCl in the strip solution was increased from 1.5 to 3 M, scandium strip recoveries increased significantly. Scandium recoveries exceeded 92% in all three tests using the 3M HCl strip solution. These results suggest that a pilot-scale SX circuit implementing the foregoing process may utilize a 3M HCl and 2M NaCl strip solution at a 1:1 A/O ratio.

TABLE 9

Bench Scale Strip tests with 1.5M HCl and 2M NaCl

| Test | Fresh Aqueous Strip Volume (mL) | Organic Volume (mL) | A/O Ratio | Organic Sc (g/L) | Sc Strip Recovery (%) | Strip Solution Chemistry |
|---|---|---|---|---|---|---|
| Organic Feed | N/A | N/A | N/A | 4.37 | N/A | N/A |
| 1 | 5 | 50 | 0.10:1 | 4.02 | 8.0 | 1.5M HCl, 2M NaCl |
| 2 | 10 | 50 | 0.20:1 | 3.69 | 15.5 | 1.5M HCl, 2M NaCl |
| 3 | 10 | 25 | 0.40:1 | 3.67 | 16.0 | 1.5M HCl, 2M NaCl |
| 4 | 10 | 10 | 1.0:1 | 3.64 | 16.7 | 1.5M HCl, 2M NaCl |

TABLE 10

Bench Scale Strip tests with 3.0M HCl and 2M NaCl

| Test | Fresh Aqueous Strip Volume (mL) | Organic Volume (mL) | A/O Ratio | Organic Sc (g/L) | Sc Strip Recovery (%) | Strip Solution Chemistry |
|---|---|---|---|---|---|---|
| Organic Feed | N/A | N/A | N/A | 0.66 | N/A | N/A |
| 1 | 17 | 35 | 0.49:1 | 0.05 | 92.4 | 3.0M HCl, 2M NaCl |
| 2 | 25 | 25 | 1.0:1 | 0.01 | 98.9 | 3.0M HCl, 2M NaCl |
| 3 | 30 | 15 | 2.0:1 | 0.05 | 92.1 | 3.0M HCl, 2M NaCl |

Example 9

Laboratory studies were conducted to examine the behavior of scandium stripping from loaded Primene JMT organic solvent using $HCl/MgCl_2$ strip solutions. Some of the results of this study are set forth in TABLE 11 below.

TABLE 11

Sc Recovery with $HCl/MgCl_2$ Strip Solutions

| Sample | Mix Time (mins) | Loaded Strip Liquor Sc (ppm) | Fe (ppm) | Strip Extraction % Sc |
|---|---|---|---|---|
| pH 2 HCl + 1.0M $MgCl_2$ | 3 | 58.9 | 18 | 81 |
| 30 g/L HCl + 0.5M $MgCl_2$ | 3 | 67.1 | 19 | 92 |
| 30 g/L HCl + 1.0M $MgCl_2$ | 3 | 66.6 | 20 | 91 |

These studies demonstrated that the use of $HCl/MgCl_2$ strip solutions permit use of lower concentrations of both salt and acid. Indeed, it has been found that the use of HCl/MgCl$_2$ strip solutions reduces HCl operating requirements from 100% to 20%, which represents a large reduction in the operating cost of the process. Without wishing to be bound by theory, the need for lower concentrations of acid is believed to be due to the effect of MgCl$_2$ in lowering the pH of the HCl solution. Similarly, the decreased amount of salt required is believed to be due to the increased chloride ion concentration provided by MgCl$_2$ compared to NaCl as a result of stoichiometry.

It will be appreciated from the foregoing that methods for isolating scandium values have been disclosed herein, which preferably comprise (a) extracting scandium values from a leachate with an organic solvent, thereby obtaining a scandium-loaded organic solvent, wherein the leachate contains iron and scandium ions, and wherein the organic solvent contains a primary amine; and (b) stripping the scandium values from the scandium-loaded solvent with a stripping solution containing an acid and a salt.

Various modifiers may be utilized in the systems and methodologies disclosed herein. These include, without limitation, TBP and isodecanol (IDA).

Various amines may be utilized in the systems and methodologies disclosed herein. Preferably, the amine is a primary amine. In some embodiments, the amine may have one or more tertiary alkyl groups.

Various salts may be utilized in the systems and methodologies disclosed herein. These include, without limitation, various alkali metal salts and ammonium salts. For example, salts may be utilized in the stripping solutions of these systems and methodologies which have the formula $M_xA_y$, where x and y are preferably (but not necessarily) non-zero, positive integer values, wherein M is selected from the group consisting of Na, K, Li and NH$_4$, and wherein A is a suitable anion. Preferably, the anion of the salt is selected to be the same as the anion of the acid it is used in conjunction with. Thus, for example, if the acid is sulfuric acid, the use of sodium, potassium, lithium and ammonium sulfates is preferred; if the acid is nitric acid, the use of sodium, potassium, lithium and ammonium nitrates is preferred; if the acid is hydrochloric acid, the use of sodium, potassium, lithium and ammonium chlorides is preferred; and if the acid is phosphoric acid, the use of sodium, potassium, lithium and ammonium phosphates is preferred. However, it will be appreciated that, in some applications, various mixtures of the foregoing acids and salts may be utilized. Moreover, in some applications, acids and anions other than those explicitly listed above may be utilized.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, absent an explicit teaching otherwise, any limitation in any dependent claim may be combined with any limitation in any other dependent claim without departing from the scope of the invention, even if such a combination is not explicitly set forth in any of the following claims.

What is claimed is:

1. A method for recovering scandium values from scandium-bearing ores, the method comprising:

providing a scandium-bearing ore;

subjecting the scandium-bearing ore to an acid leaching process, thereby obtaining a leachate, wherein the pH of the leachate is less than 1.5;

extracting scandium values from the leachate with an organic solvent, thereby obtaining a scandium-loaded organic solvent, wherein the leachate contains iron and scandium ions, and wherein the organic solvent contains a primary amine;

stripping the scandium values from the scandium-loaded solvent with a stripping solution containing an acid and a salt, thereby obtaining a scandium-loaded stripping solution, wherein the acid is selected from the group consisting of sulfuric acid, nitric acid, hydrochloric acid and phosphoric acid, wherein the salt is selected from the group consisting of alkali chlorides, alkali earth chlorides, alkali nitrates, alkali sulfates, alkali phosphates, ammonium chlorides, ammonium nitrates, ammonium sulfates and ammonium phosphates, and wherein the salt comprises a cation selected from the group consisting of Na, K, Li, NH$_4$ and Mg; and processing the scandium-loaded stripping solution to yield scandium oxide.

2. The method of claim 1, wherein the stripping solution contains hydrochloric acid, and wherein the salt is selected from the group consisting of alkali chlorides, alkali earth chlorides and ammonium chlorides.

3. The method of claim 1, wherein the stripping solution contains sulfuric acid, and wherein the salt is selected from the group consisting of alkali sulfates, alkali earth sulfates and ammonium sulfates.

4. The method of claim 1, wherein the stripping solution contains nitric acid, and wherein the salt is selected from the group consisting of alkali nitrates, alkali earth nitrates and ammonium nitrates.

5. The method of claim 1, wherein the stripping solution contains phosphoric acid, and wherein the salt is selected from the group consisting of alkali phosphates, alkali earth phosphates and ammonium phosphates.

6. The method of claim 1, wherein the stripping solution contains hydrochloric acid, wherein the salt is sodium chloride, and wherein the concentration of hydrochloric acid in the stripping solution is greater than 2M.

7. The method of claim 1, wherein the stripping solution contains hydrochloric acid, wherein the salt is sodium chloride, and wherein the concentration of hydrochloric acid in the stripping solution is at least 2.5M.

8. The method of claim 1, wherein the stripping solution contains hydrochloric acid, wherein the salt is sodium chloride, and wherein the concentration of hydrochloric acid in the stripping solution is within the range of 2.5M to 3.5M.

9. The method of claim 7, wherein the molar ratio of hydrochloric acid to sodium chloride is within the range of 1 to 2.

10. The method of claim 7, wherein the molar ratio of hydrochloric acid to sodium chloride is within the range of 1.25 to 1.75.

11. The method of claim 1, wherein the stripping solution contains hydrochloric acid, wherein the salt is magnesium chloride, and wherein the concentration of hydrochloric acid in the stripping solution is greater than 0.1 M but less than 2.5 M.

12. The method of claim 1, wherein the stripping solution contains hydrochloric acid, wherein the salt is magnesium chloride, and wherein the concentration of hydrochloric acid in the stripping solution is at least 0.25M.

13. The method of claim 1, wherein the stripping solution contains hydrochloric acid, wherein the salt is magnesium chloride, and wherein the concentration of hydrochloric acid in the stripping solution is within the range of 0.25M to 1M.

14. The method of claim 1, wherein the stripping solution contains hydrochloric acid, wherein the salt is magnesium chloride, and wherein the molar ratio of hydrochloric acid to magnesium chloride is within the range of 0.1 to 1.

15. The method of claim 1, wherein the acid leaching process is a high-pressure acid leaching (HPAL) process.

16. The method of claim 1, wherein the acid leaching process is an atmospheric pressure acid leaching process.

17. The method of claim 1, wherein the acid leaching process includes an acid baking process.

18. The method of claim 1, wherein the pH of the leachate is less than 1.

19. The method of claim 1, wherein the primary amine has at least one tertiary alkyl group.

20. The method of claim 1, wherein the primary amine has a plurality of t-alkyl groups.

21. The method of claim 1, wherein the primary amine has the structure $R_3CNH_2$, wherein R is a t-alkyl group.

22. The method of claim 21, wherein each R has 5 to 7 carbon atoms.

23. The method of claim 1, wherein the primary amine is decamthyl decyl amine.

24. The method of claim 1, wherein the organic solvent includes a diluent and a phase modifier.

25. The method of claim 1, wherein the leachate further contains one or more ions selected from the group consisting of Al, Mg, Mn, Ni and Co.

26. The method of claim 1, wherein the scandium-loaded organic solvent has a scandium concentration of greater than 0.5 g/L Sc.

27. The method of claim 1, wherein the scandium-bearing ore is a laterite ore.

* * * * *